United States Patent [19]
Woods

[11] 3,816,307
[45] June 11, 1974

[54] FIRE RETARDANT RESINS

[76] Inventor: William G. Woods, 1011 N. Lemon St., Fullerton, Calif. 92631

[22] Filed: Apr. 28, 1972

[21] Appl. No.: 248,771

Related U.S. Application Data

[63] Continuation of Ser. No. 54,636, July 13, 1970, abandoned.

[52] U.S. Cl. ............. 252/8.1, 162/159, 260/2.5 AJ, 260/2.5 FP, 260/45.7 R, 260/45.75 B, 260/45.75 B
[51] Int. Cl. ............................................. C09k 3/28
[58] Field of Search ... 260/45.75 R, 45.7 R, 2.5 AJ, 260/2.5 FP, 45.75 B; 162/159; 252/8.1

[56] References Cited
UNITED STATES PATENTS

| | | | |
|---|---|---|---|
| 3,245,870 | 4/1966 | Orth et al. | 162/159 |
| 3,283,036 | 11/1966 | Larson | 260/897 R |
| 3,333,970 | 8/1967 | Green | 260/41 B |
| 3,352,817 | 11/1967 | Meyer | 260/94.9 G |
| 3,639,299 | 2/1972 | MacDowall | 260/45.75 B |
| 3,697,456 | 10/1972 | Pitts | 260/45.75 R |

*Primary Examiner*—Melvyn I. Marquis
*Attorney, Agent, or Firm*—J. R. Thornton

[57] ABSTRACT

A composition for rendering resin compositions fire retardant consisting essentially of a dry mixture of particles of a finely divided Group I metal borate or ammonium borate, said borate having an average particle size of from 0.1 to about 25 microns, and antimony oxide, the weight ratio of said borate to antimony oxide being no greater than 4:1.

8 Claims, No Drawings

FIRE RETARDANT RESINS

RELATED APPLICATIONS

This is a continuation of my copending U.S. Pat. application Ser. No. 54,636, filed July 13, 1970, which is a division of our co-pending U.S. Pat. application, Ser. No. 647,189, filed June 19, 1967 both now abandoned.

BACKGROUND OF THE INVENTION

1. Field of Invention

The present invention relates to fire retardant plastic compositions and more particularly to inorganic borate loaded fire retardant organic polymers.

DESCRIPTION OF THE PRIOR ART

With the advancement of reinforced plastic molding, casting and laminating technology, applications of plastics are quickly increasing as structural and decorative materials in buildings, aircraft, watercraft and other structures. Most of these plastics are combustible and the flammability of resin coatings also presents a serious hazard. This has created a need for efficient and economical fire retardant materials.

An effective fire retardant plastic material should be curable to a hard condition, should have a low-burning rate, preferably self-extinguishing after a short interval, and desirably some structural strength is left after burning.

SUMMARY OF THE INVENTION

The fire retardant resinous materials of the invention demonstrate these desirable characteristics and further surprisingly do not exhibit loss of hardness or increased burning rate after water leaching even though based on the presence of water soluble additives.

The plastic materials of the invention burn sufficiently slowly to satisfy accepted testing standards without any substantial dripping, leaving large ash fractions and large contiguous chars, so important in maintaining structural integrity of panels during an actual fire situation.

These and many other attendant advantages of the invention will become apparent as the description proceeds.

The fire retardant plastics of the invention include as an essential component, a fire retardant amount of a fine sized borate of a Group I metal, or ammonium such as sodium, potassium, or lithium. Particularly preferred are the hydrated sodium borates having an $Na_2O:B_2O_3$ molar ratio of no more than 0.5. The average particle size of the borate is from 0.1 to about 25 microns and is preferably less than about 15 microns. The resin composition may also include other fire retardant materials such as phosphates, antimony compounds or boric acid.

The borates of the invention can be incorporated into a wide variety of resins whether of the condensation type such as polyesters, polyphenyleneoxides, polyalkyleneoxides, polyamides, polyvinylethers, polycarbonates, polyaldehydes, polyacrylates, polymethacrylates, polyurethanes and epoxy resins, or of the polyolefin type such as, polymers or copolymers of ethylene, propylene, butylene, vinylchloride, vinylidinechloride, styrene, acrylonitrile or elastomeric diene polymers such as polymers of butadiene, isoprene, chloroprene and copolymers thereof with styrene, acrylonitrile or isobutylene.

The plastics of most interest are the casting and molding resins such as polyesters, epoxies and vinyls. For example, a polyester can be used as a molding resin or as a casting resin with or without glass reinforcement. These resins are typically reaction products of a polyol such as ethylene glycol, propylene glycol, neopenthyl glycol, glycerol, pentaerythritol, trimethylolethane or trimethylopropane with a polybasic acid such as one of the three isomeric phthalic acids, adipic or sebasic acid. Polyesters may be modified with monobasic acids or monohydric alcohols.

The polyester resins utilized in reinforced plastics generally contain ethylenic unsaturation provided by maleic, fumaric or other unsaturated acid; the amount present depending on the rigidity desired. These resins may then be cross-linked with a reactive monomer such as styrene, α-methylstyrene, diallyl phthalate or methyl methacrylate.

After processing, the resin is dissolved in reactive monomer. Cure is initiated by a free radical catalyst, usually an organic peroxide or hydroperoxide, and the cure is accelerated by the use of heavy metal salts of organic acids. Many such polyester resins are commercially available. A typical polyester is formed from a polypropylene glycol, isopthalic and maleic acids and has an Acid Number less than 20 and a Hydroxyl Number less than 40. The polyester contains 32 percent styrene and is inhibited with t-butylpyrocatechol. This resin cures rapidly and may be molded with glass mat, chopped rovings or other reinforcement to form high strength, high heat distortion point products.

To illustrate the properites of the composition of the invention, measured portions of borate fire retardant materials were added to 100 parts by weight of the above-described polyesters, according to the following procedure.

EXAMPLE 1

Specimens for burning tests were made with the polyester dissolved in 15 p.h.r. (parts by weight per one hundred parts of resin) of additional styrene. 0.2 p.h.r. of 12 percent cobalt octoate were dispersed in the resin with the fire retardant additive by mixing in a paper cup using a wooden mixing stick or by spatula grinding on a glass plate. 1 to 2 p.h.r. of methyl ethyl ketone peroxide was then added and mixed in and the resin preparation cast onto a cellophane-covered glass plate with 0.125 inch steel spacers to form a 6 × 8 inch rectangle. After bubble elimination, the top sheet of glass was placed in position and the resin allowed to cure at room temperature. If necessary, the casting was post cured for 1 to 2 hours at 60° to 100° C. The glass, spacers and cellophane were removed and the casting cut into 0.50 inch strips.

The burning rate and hardness results of several of such castings are reported in the following table:

TABLE I

Burning Rates of Polyester Castings

| Casting Number | Additive | Size (Microns) | P.H.R. | Burn Rate (in/min.) | Hardness (Barcol) | Self-Ext. (Time, min) |
|---|---|---|---|---|---|---|
| 1. | Control | | None | 0.76–0.84 | 44.6 | |
| 2. | Borax (imp.) | 42 | 10 | 0.49 | 44.3 | |
| 3. | do. | | 30 | 0.41 | 49.1 | |
| 4. | do. | | 100 | 0.13 | 37.6 | 2.01±0.15 |
| 5. | Borax-Boric Acid | 42 | 21 9 | 0.31 | 41.6 | |
| 6. | Borax-Boric Acid | 42 | 35 15 | 0.21 | 16.3 | |
| 7. | $Na_2O:B_2O_3(0.28)$ | 35–40 | 10 | 0.57 | 47.2 | |
| 8. | do. | | 75 | 0.22 | 55.4 | |
| 9. | do. | | 100 | 0.20 | 54.5 | 2.67±0.15 |
| 10. | Polybor | 14 | 50 | 0.34 | 51.5 | |
| 11. | do. | | 100 | 0.22 | 56.9 | 2.76±0.21 |
| 12. | Ammonium Biborate | 36 | 10 | 0.51 | 38.0 | |
| 13. | do. | | 20 | 0.36 | 44.9 | |

Burning tests were obtained by the ASTM D 757–49 (Globar) method. The distance burned was measured to the melt line, which is found between the tip and the soot line representing the maximum extension of actual burning. Burn rate in inches per minute is found by dividing the burnt length by three minutes. Specimens that were self-extinguishing were left in the horizontal position pointing towards the hot Globar for the full three minutes. An aluminum foil was placed beneath the specimen to collect molten drippings or fallen ash. It can be seen that significant improvement in burning rate resulted from the addition of Group I metal or ammonium borates. $Na_2O:B_2O_3(0.28)$ is a hydrated sodium borate containing about 66 percent $B_2O_3$ having a molar ratio of $Na_2O:B_2O_3$ of about 0.28. This borate unless otherwise indicated, is a −200 mesh product having an average particle size of abut 35 to 40 microns. "Polybor" is an amorphous hydrated sodium borate having the general empirical formula $Na_2B_8O_{13}\cdot 4H_2O$ and borax is a decahydrated sodium tetraborate.

Water of hydration has marked influence on burning rate, dehydrated products showing much poorer burn rate performance. None of the castings are self-extinguishing at borate additive levels below 20 p.h.r. and preferably contain at least 100 p.h.r. of borate to be self-extinguishing. The burned castings were observed to leave & large, contiguous char which did not disintegrate or fall from the specimen at the end of the burning test and a large fraction of ash. The control casting containing no borate additive did not form an ash but it lost 8.6 percent of its weight as burning drippings, whereas the castings containing borax, $Na_2O:B_2O_3(0.28)$, Polybor, or ammonium biborate gave no drippings and left about 6 to 16 percent ash with a continuous and contiguous char with considerable structural integrity.

Any material added to a polymeric system can be expected to have some effect on physical properties such as hardness, tensile and flexural strength modulus, head distortion temperature (HDT), water resistance, gelling time, etc. Insoluble additives usually weaken a polyester casting. Boric acid along gives very low burning rates, but the boric acid appears to inhibit cure resulting in a low hardness polyester casting. Post curing at 100° C partially rectifies this problem but results in a higher burning rate. Castings containing boric acid-sodium borate mixtures, especially these having an $Na_2O:B_2O_3$ molar ratio below 0.5 and preferably from 0.25 to 0.30, are found to have acceptable burning rates and hardness. Castings containing a portion of sodium borate are found to have comparable strength and higher modulus than castings loaded with comparable amounts of antimony oxide, a leading fire retardant. Again, while boric acid appears to adversely affect hardness and gel time, sodium borate additives in the range of 0 to 50 p.h.r. appear to decrease gel time and to increase hardness.

Hardness, as discussed above, is mainly a measure of degree of cure of the initially formed casting. An important property of a casting intended for exterior architectural use, marine use or other aqueous environment, is its resistance to water which again can be measured in terms of hardness. To measure this characteristic of the castings, test specimens containing 0 to 100 p.h.r. of various borates added as fire retardant were suspended in 900 ml. of distilled water in one liter beakers for 90–500 hours at 23° C and dried, according to the following procedure:

EXAMPLE 2

A sample of $Na_2O:B_2O_3(0.28)$ was mechanically pulverized and screened. The −400 mesh material on microscopic examination was found to have an average particle size of 12.95 ± 4.88 microns. Castings were prepared and cured as in Example 1 and were immersed in water for 500 hours at 76° F. The Barcol hardness values before and after water soaking and the overall weight changes are given in the following table. Observed loss of borate was measured by alkalinity and boron titrations of the leach water.

TABLE II

Water Resistance of Finely Divided Borate Fire Retardants Polyester Castings

| Casting Number | $Na_2O:B_2O_3$- (0.28) Phr | Size Microns | Barcol Initial | Hardness Final | Wt. Chg % | % Borate in Leach Water |
|---|---|---|---|---|---|---|
| 1. | Control | | 44.7 | 46.1 | +0.16 | |
| 2. | 10 | 35–40 | 48.2 | 44.4 | +0.89 | 3.37 |
| 3. | 10 | 13 | 50.0 | 45.7 | +0.80 | 2.53 |
| 4. | 20 | 35–40 | 50.1 | 25.6 | −5.01 | 40.46 |
| 5. | 20 | 13 | 51.6 | 45.2 | +1.18 | 2.95 |

Large weight losses are found for castings containing more than about 20 phr of as is 35–40 micron $Na_2O:B_2O_3$(0.28) sodium borate and correspondingly the hardness for these castings falls precipitiously after water treatment and is significantly lowered at this loading level.

as discussed above and one set of each series being immersed in water for 500 hours at 76° F before being subjected to the Globar burn testing procedure of ASTM D 757–49. Ten phr of Chlorowax 70 (Diamond Alkali), a chlorinated paraffin wax containing 70 percent chlorine, was present in Castings 4–8.

TABLE III

Fire Retardancy vs. Particle Size

| Cast. No. | Additive, phr | | PRE LEACH | | | | POST LEACH | | | |
|---|---|---|---|---|---|---|---|---|---|---|
| | $Na_2O:B_2O_3$ (0.28) | $Sb_2O_3$ | Burn Rate, Min. | | Self-Ext. Time, Min. | | Burn Rate, Min. | | Self-Ext. Time, Min. | |
| | | | 35–40μ | 13μ | 35–40μ | 13μ | 35–40μ | 13μ | 35–40μ | 13μ |
| 1. | 0 | 0 | 0.88 | 0.88 | | | 0.80 | 0.80 | | |
| 2. | 10 | | 0.66 | 0.71 | | | 0.70 | 0.56 | | |
| 3. | 20 | | 0.59 | 0.65 | | | 0.75 | 0.53 | | |
| 4. | 7.5 | | 0.21 | 0.29 | 2.3 | 2.0 | 0.27 | 0.27 | 2.44 | 2.1 |
| 5. | 10 | | 0.25 | 0.31 | 2.6 | 2.7 | 0.33 | 0.31 | 7.55 | 2.35 |
| 6. | 12 | | 0.36 | 0.44 | | | 0.38 | 0.38 | | |
| 7. | — | 15 | 0.18 | | 1.5 | 1.5 | 0.17 | | 1.5 | 1.5 |
| Borax | | | 150μ | 8μ | 150μ | 8μ | 150μ | 8μ | 150μ | 8μ |
| 8. | 10 | 5 | 0.29 | 0.25 | | | 0.35 | 0.31 | 2.65 | 2.60 |

However, it has surprisingly been discovered according to the invention, that the physical and burning properties of castings can be maintained or improved and the leaching of borate fire retardants substantially inhibited by utilizing fine sized borates. This is contrary to expectation since a material presenting a larger total particle surface area would be expected to have greater solubility and borate loss.

A striking decrease in leaching of boron is found when the borate additive is reduced in particle size. In every case, the 13 micron (μ) material is leached out to a considerably reduced extent, the ratio of borate removed (13 μ):(35–40μ) varies from 0.073 to 0.75 but is always less than unity. In the case of a borax material having an average particle size of about 150 microns, boron is removed 18 times faster than a corresponding 8 micron material.

Castings in which a sizeable proportion of the usual sized borate was removed by leaching also showed a marked lowering of the Barcol hardness while no unusual lowering of the hardness is observed using the same loading of finely divided material. Furthermore, the degree of weight change is substantially narrowed. Castings including up to 20 phr of the coarser materials of commerce exhibited an overall weight change of +0.16 to −5.01 whereas with the finely divided borates the change is only from +0.10 to +1.18. It is significantly more advantageous to utilize a material which will only slightly change in weight on prolonged immersion in water.

The burning rates of the castings with the fine sized materials are about the same or slightly better. A further striking characteristic of the fire retardant plastics of the invention is the exhibition of increased fire retardancy after immersion in water for 500 hours at 76° F. Castings with borates of normal particle size lose some fire retardancy on leaching, attributable apparently to the lowered level of additive.

These improvements further apply to castings containing alkali, or ammonium borates along or in combination with other fire retardants such as antimony oxide, chlorinated wax or phosphate esters. The following data reported in the table below represents burning tests of comparably loaded polyester castings prepared Burning rates increase slightly after leaching for the castings containing the commercial sized materials whereas the burning rates for the castings containing the finer sized sodium borates are seen to have actually decreased after water leaching.

This difference is particularly striking in casting No. 3 where a substantial decrease in burning rate was found after leaching the casting with the 13 micron borate loaded casting whereas the casting containing the regular sized borate actually burned substantially faster after leaching under identical conditions.

Low-burning rate and self-extinguishing castings can be provided with total lower loading of fire retardant additives by replacing part of the fine sized borate with antimony oxide. Such castings, suitably containing 3 to 50 phr of borate and 0.5 to 10 phr of antimony oxide, also exhibit low loss of boron on leaching and decreased burning rate after leaching as compared to castings loaded with comparable amounts of "as is" coarser borates.

Antimony oxide is a fairly expensive material and it is desirable to utilize as little as possible to achieve desired flame retardancy and self-extinguishing properties. Castings containing 14 phr of $Na_2O:B_2O_3$(0.28) and 1 phr, of antimony oxide that is 93 percent borate, are not self-extinguishing but when the proportion is decreased to 80 percent that is, 12 phr of borate to 3 phr of antimony oxide, a weight ratio of 4/1 borate: antimony oxide, the casting is self-extinguishing in under 2–3 minutes with a reasonably low-burning rate. Furthermore, compared with polyester castings containing 15 phr of antimony oxide and 10 phr of Chlorowax 70 the polyester resin casting in which two-thirds of the antimony oxide is replaced with finely divided hydrated sodium borate has comparable strength and a higher modulus.

Antimony oxide is alway used in the presence of a halogenated material which can be a chlorinated aliphatic material such as low molecular weight chlorinated paraffin wax or a chlorinated aromatic. The chlorine may also be present in the resin itself such as polyvinyl chloride. The following is an example of a procedure for incorporating the finely divided borates of the invention into polyvinyl chloride (PVC) resins.

EXAMPLE 3

Two parts of GEON 121 (B. F. Goodrich) powdered polyvinyl chloride were mixed with one part of dioctyl phthalate to form a PVC plastisol. Various amounts of fire retardant and 0.01 phr of Stabalan E (Nopco Chemical Co.), a fluoborate stabilizer, were added by mixing. A casting sheet was prepared by pressing the plastisol between glass plates fitted with a Tygon gasket and 0.125 inch metal spacers. Curing was effected by heating for one hour in an oven at 160° C. The results of the Globar burning test follow:

TABLE IV

| Casting Number | Additive | phr Amount | Burn Rate In/Min. | Self-Ext. Time, Min. |
|---|---|---|---|---|
| 1. | None | | 0.72 | 2.92 |
| 2. | $13\mu Na_2O:B_2O_3(0.28)$ | 20 | 0.50 | 2.45 |
| 3. | $13\mu Na_2O:B_2O_3(0.28)$ $Sb_2O_3$ | 5 5 | 0.22 | 1.42 |
| 4. | $13\mu Na_2O:B_2O_3$ $Sb_2O_3$ | 7 | 0.23 | 1.52 |

It is seen that finely divided sodium borate gives substantially reduced burning rates whether used alone or in combination with other fire retardant additives.

The preparation of still another fire retardant system is exemplified as follows:

EXAMPLE 4

Finely divided ($13\mu$) $Na_2O:B_2O_3(0.28)$ was added to a typical epoxy resin system by mixing the borate with an epichlorohydrin resin, such as Epon 28 (Shell Chemical Co.) and 4phr of DMP–30 tris(dimethylaminomethyl) phenol (Rohm and Haas), and cured for 24 hours at 260° F. The control burned at a rate of 1.07 inches per minute while castings containing 25 phr and 50 phr of $Na_2O:B_2O_3(0.28)$ had reduced burning rate of 0.91 and 0.77 inches per minute. Some of the borate loaded samples were self-extinguishing and whereas the control dripped and melted away during the burning test, the samples containing borate left a solid char with considerable structural integrity.

It is to be understood that the foregoing only relates to preferred embodiments of the invention offered by way of illustration and that numerous substitutions, modifications, and alterations are permissible without departing from the scope of the invention as defined in the following claims:

What is claimed is:

1. A composition for rendering resin compositions fire retardant consisting essentially of a dry mixture of particles of a finely divided Group I metal borate or ammonium borate, said borate having an average particle size of from 0.1 to about 25 microns, and antimony oxide, the weight ratio of said borate to antimony oxide being no greater than 4:1.

2. A composition according to claim 1 further including a halogenated organic material.

3. A composition according to claim 1 in which the borate is a hydrated sodium borate having a molar ratio of $Na_2O:B_2O_3$ of no more than 0.5 and an average particle size of no more than about 15 microns.

4. A self-extinguishing fire retardant for a polyester resin consisting essentially of a dry mixture of antimony oxide, a chlorinated organic compound and a finely divided alkali metal borate or ammonium borate having an average particle size below 25 microns, the weight ratio of borate to antimony oxide being no greater than 4:1.

5. A composition in accordance with claim 1 in which said particles have an average size of less than about 15 microns.

6. A composition in accordance with claim 1 in which said borate is sodium borate.

7. A composition in accordance with claim 3 in which the said $Na_2O:B_2O_3$ molar ratio is 0.25 to 0.30.

8. A composition for rendering resin compositions fire retardant consisting essentially of a dry mixture of particles of a sodium borate having an $Na_2O:B_2O_3$ molar ratio of 0.28, said borate having an average particle size of from 0.1 to about 25 microns.

* * * * *

UNITED STATES PATENT OFFICE
CERTIFICATE OF CORRECTION

PATENT NO. : 3,816,307
DATED : June 11, 1974
INVENTOR(S) : WILLIAM G. WOODS

It is certified that error appears in the above-identified patent and that said Letters Patent are hereby corrected as shown below:

On Title page, Column 1 after "William G. Woods, 1011 N. Lemon St., Fullerton, Calif. 92631" add --Assignee: United States Borax & Chemical Corporation, Los Angeles, Calif.--

Signed and Sealed this eighth Day of June 1976

[SEAL]

Attest:

RUTH C. MASON
Attesting Officer

C. MARSHALL DANN
Commissioner of Patents and Trademarks